March 18, 1958     K. P. W. NITSCHE     2,827,062
CONVEYING APPARATUS

Filed March 14, 1955     2 Sheets-Sheet 1

INVENTOR
*Karl Paul Wolfgang Nitsche*

BY *Stevens, Davis, Miller & Mosher*
ATTORNEYS

March 18, 1958  K. P. W. NITSCHE  2,827,062
CONVEYING APPARATUS
Filed March 14, 1955
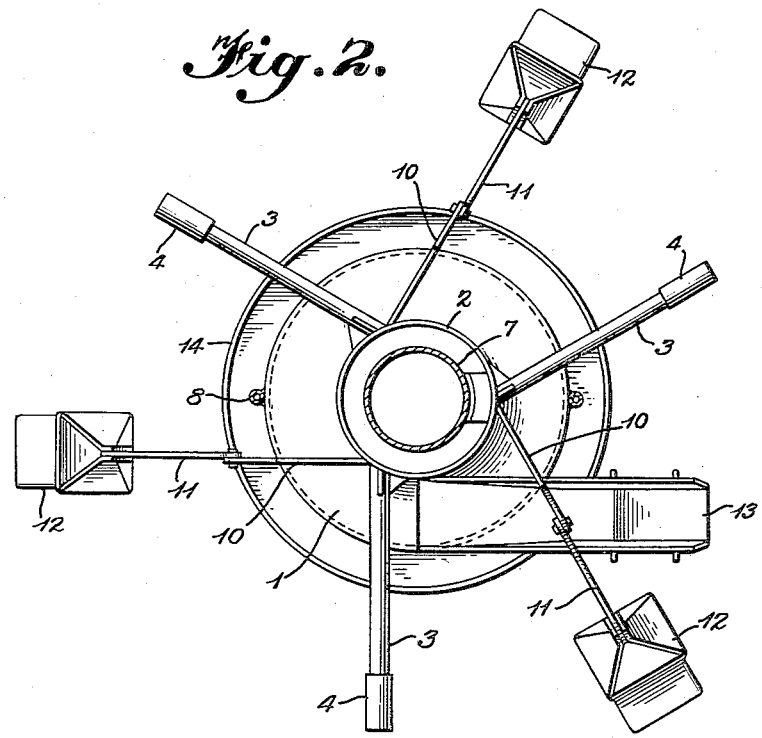
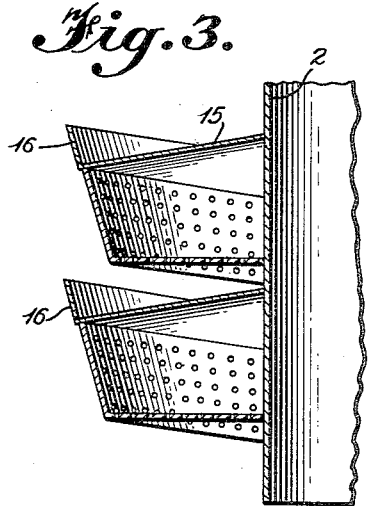
INVENTOR
Karl Paul Wolfgang Nitsche
BY Stevens, Davis, Miller & Mosher
ATTORNEYS

United States Patent Office 2,827,062
Patented Mar. 18, 1958

2,827,062

CONVEYING APPARATUS

Karl Paul Wolfgang Nitsche, Alvsjo, Sweden

Application March 14, 1955, Serial No. 494,061

Claims priority, application Sweden March 19, 1954

5 Claims. (Cl. 134—132)

The present invention relates to a conveying apparatus for lifting a piece-shaped material from a lower to a higher level. The apparatus is more particularly adapted to be used for feeding a piece-shaped material through a degreasing liquid.

The apparatus according to this invention comprises a helical chute having a vertical axis and suspended so as to be capable of a limited movement in all directions, the inlet of said chute being positioned at the lower end thereof and its outlet at the upper end thereof, and one or more vibrating devices carried by said chute, suitably near the upper end thereof, said vibrating device or devices being so positioned that the chute is imparted reiterated raising and lowering movements and simultaneously reiterated reciprocating arcuate movements, whereby the goods to be lifted are caused to move up along said chute.

In a suitable embodiment of the invention the or each vibrating device is attached to an arm secured to the chute or to a concentric part rigidly secured thereto, said arm engaging the chute in a direction inclined away from the horizontal and radial directions so as to impart to the chute an upward movement simultaneously with an angular movement in the direction of feed.

The invention will be described in detail below in connection with the accompanying drawings which show by way of example a preferred embodiment thereof. In the drawings:

Fig. 2 is a section taken along line II—II in Fig. 1; and

Fig. 3 shows a fragment of the chute in section and on a larger scale.

Figure 1:
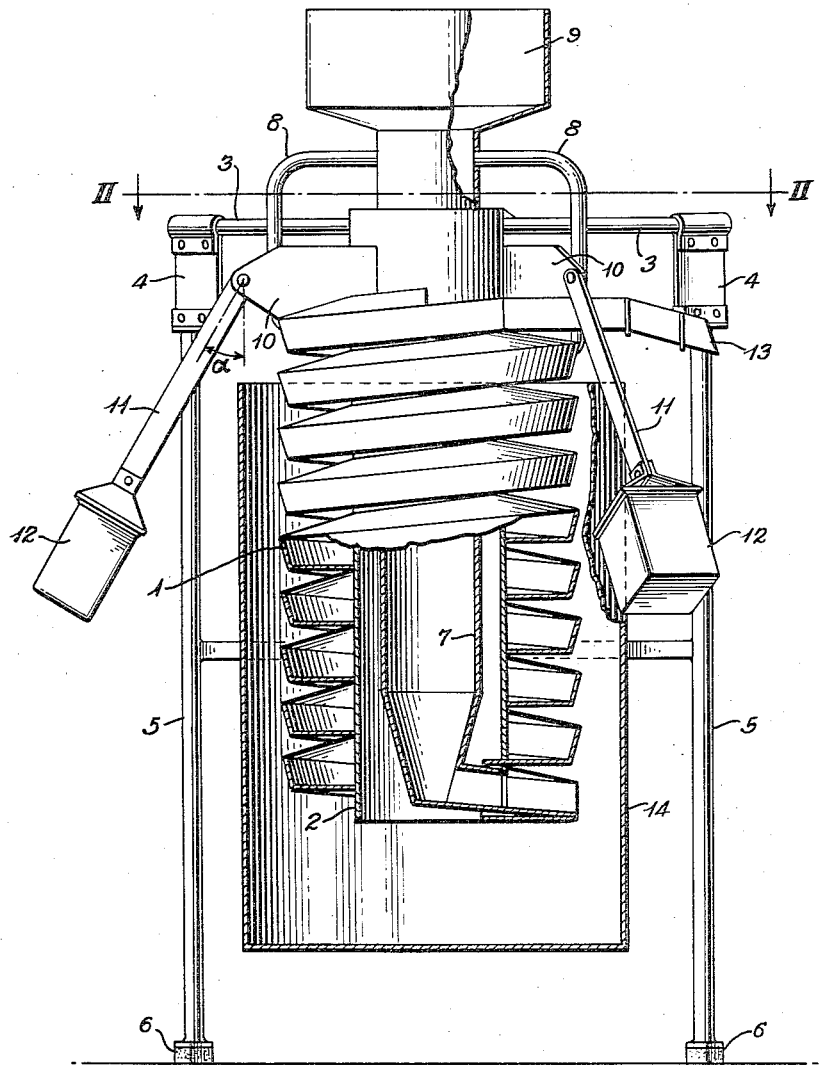
Fig. 1 illustrates the entire apparatus in elevation and partly in section.

On the drawings, the numeral 1 designates a helical chute, which surrounds and is rigidly connected to a central tubular casing 2. The upper end of the casing 2 which projects above the helical chute 1 is attached to a number of horizontal supporting arms 3 (three arms shown in the drawing). The opposite ends of said arms 3 are connected each to a column 5 by the intermediary of leaf springs 4. The columns 5 are supported on the base by the intermediary of rubber pads 6. Within the tubular casing 2 there is arranged a feed conduit 7 the upper end of which is attached to the chute or to the casing 2 by means of a pair of rods 8 and the lower end of which communicates with the lower end of the chute, so that pieces of material introduced through the upper end of the feed pipe 7 which is shaped as a funnel 9 will enter the chute through the lower end thereof.

At the upper end of the tubular casing 2 there are also attached three arms 10 which project from said casing in a direction inclined away from the radii and to the outer ends of which there are attached downwardly inclined arms 11. Each of said last-mentioned arms 11 carries a vibrating device 12. In consequence of the manner of attachment of the arms 10 and 11, the vibrating devices 12 will impart to the chute and to the parts connected thereto alternating lifting and lowering movements and simultaneously therewith reciprocating angular movements in the direction of feed (i. e. anti-clockwise as seen in Fig. 2) and in the opposite direction (i. e. clockwise) respectively, whereby the material is caused to move upwards through the chute toward its outlet 13.

The chute, the bottom and side-walls whereof are perforate, is placed in a container 14 filled with a suitable grease-dissolving liquid to a depth such that two or three convolutions of the chute are submerged in the liquid.

As seen in Fig. 3 the chute has a roof 15 along the circumference of which there extends an upstanding flange 16, so that impurities which drop down through the perforate bottom wall of the superjacent convolution will be lifted to a separate outlet (not shown).

The invention is not limited to the embodiment shown and described but can be varied in many ways within the scope of the invention.

Thus e. g. the chute may be supported in any manner which permits it to perform the desired movements under the action of the vibrating devices. Furthermore the vibrating devices may be directed upwardly instead of downwardly, as shown, in which case, if the chute is similar, the arms 10 must be inclined away from the radii in a manner opposite to that shown on the drawing.

Having now particularly described the nature of my invention and the manner of its operation what I claim is:

1. In a material handling apparatus for lifting material from a lower level to a higher level; the combination of a vertically disposed rigid helical chute, a supporting frame, means suspending said chute on the frame so that the chute can move in a limited manner in all directions, said chute having a lower end provided with an inlet and having an upper end provided with an outlet, at least one vibrating means attached to the chute adjacent the upper end of the chute, said vibrating means including an attachment part rigidly secured to the chute concentric thereof, an arm carried by the attachment part and extending from the chute in a direction inclined away from the horizontal and radial directions, and a vibrating device carried by the outer end of the arm to impart to the chute an upward movement simultaneously with an angular movement in the direction of feed so that the material to be lifted is caused to move up along said chute.

2. An apparatus as in claim 1 in which the sidewalls and bottom of the chute are perforate and the chute has a roof which has an upstanding flange along its circumference, said flange forming together with said roof a second lift chute for carrying away impurities dropping thereonto.

3. An apparatus as in claim 1, in which the material to be lifted is fed to the inlet end of the chute through a feed pipe arranged coaxially with the helical chute.

4. An apparatus as in claim 1, in which said chute is disposed in a tank containing a cleaning liquid so that at least two of the lower convolutions thereof are submerged in the liquid.

5. An apparatus as in claim 2, in which said roof is inclined downwardly and outwardly relatively to the bottom, the angle of inclination being at least 10°.

References Cited in the file of this patent

UNITED STATES PATENTS

| | | |
|---|---|---|
| 2,464,216 | Devol | Mar. 15, 1949 |
| 2,662,851 | Jones | Dec. 15, 1953 |